Nov. 8, 1949     C. W. LEGUILLON     2,487,149
APPARATUS FOR SPLICING ADHESIVE SHEET MATERIAL
Filed June 18, 1947     2 Sheets-Sheet 1
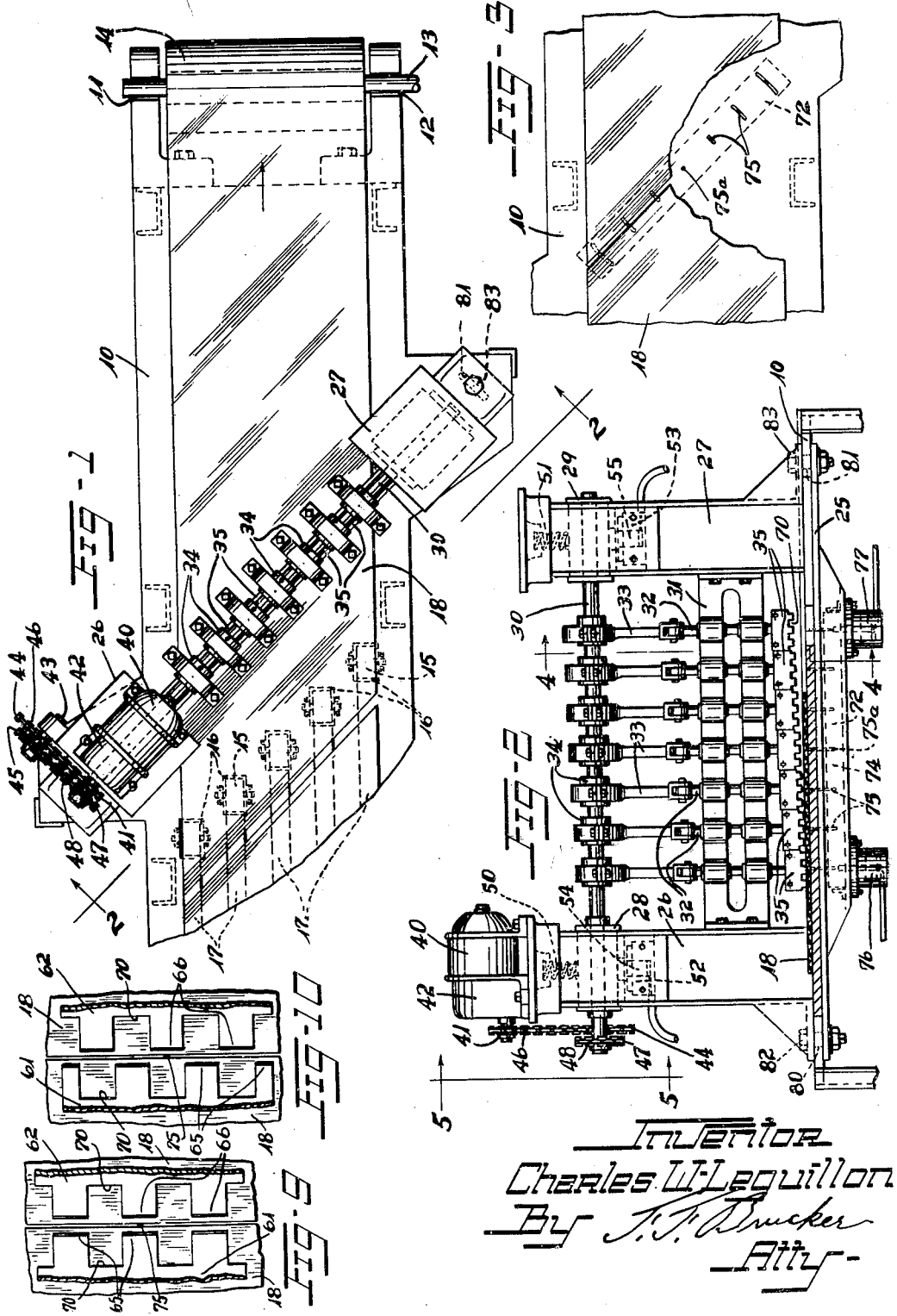
Inventor
Charles W. Leguillon
By T. F. Brucker
Atty

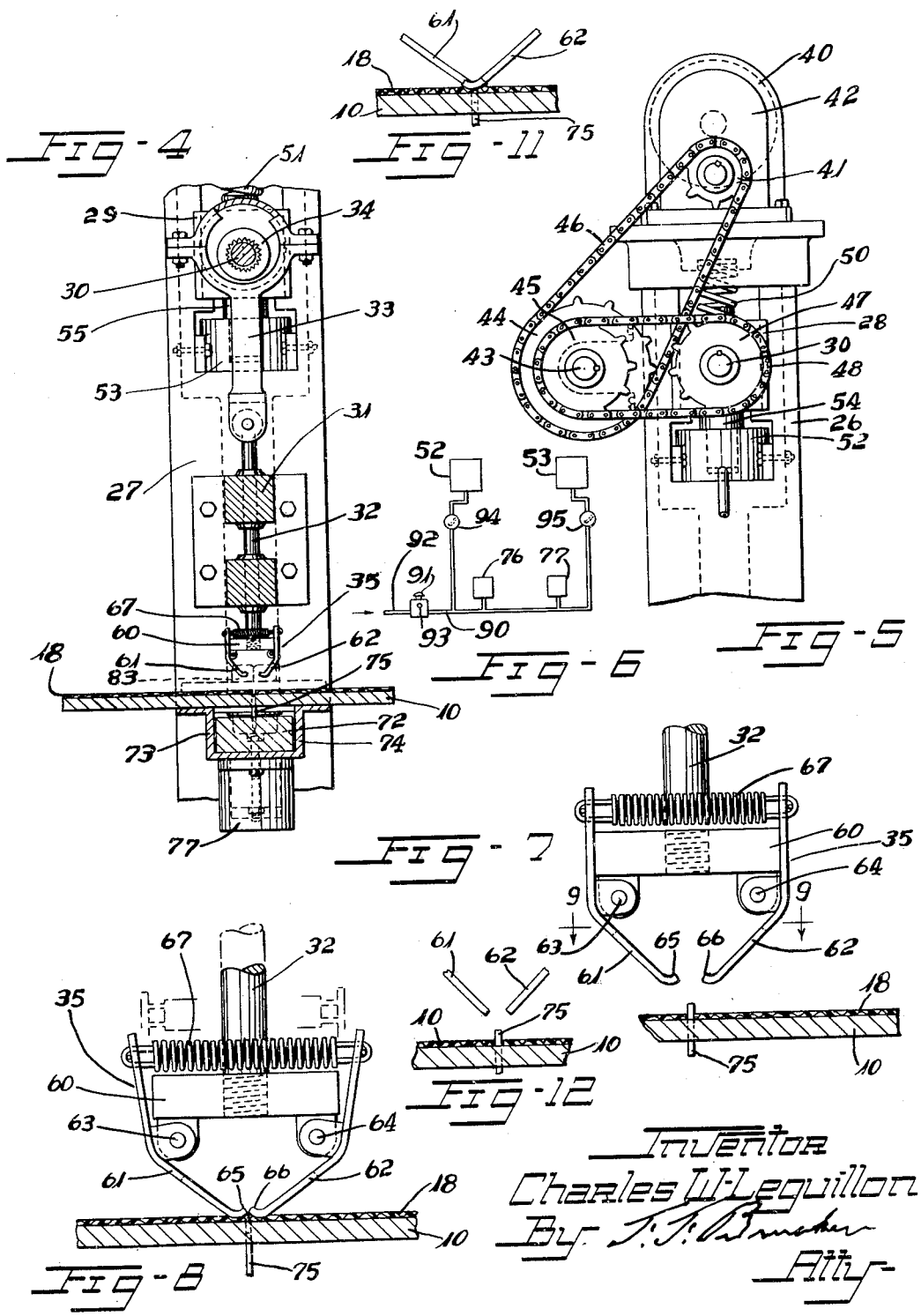

Patented Nov. 8, 1949

2,487,149

UNITED STATES PATENT OFFICE 2,487,149

APPARATUS FOR SPLICING ADHESIVE SHEET MATERIAL

Charles W. Leguillon, Akron, Ohio, assignor to The B. F. Goodrich Company, New York, N. Y., a corporation of New York Application June 18, 1947, Serial No. 755,337

17 Claims. (Cl. 154—42)

This invention relates to apparatus for splicing adhesive sheet material and is especially useful in butt splicing rubber coated cord fabric or other material having an adhesive coating.

In the manufacture of tires and other articles of material comprising parallel cords adhered to each other by unvulcanized rubber or other rubber-like adhesive material it has been found desirable to adhesively join sheets of the cord material to each other edge to edge without overlap of the material as any overlapping of the cord material has provided an extra thickness at the splices and in the molding of such fabric with rubber or other rubber-like material where the molding space has been limited such piling up of the cord material has caused thinning of the rubber-like material thereover or has resulted in undesirable crushing of the cord materials at the splices, resulting in loss of strength of the cord reinforcement.

It is an object of the present invention to provide for accurate and uniform splicing of sheets of adhesive material such as cord fabric to each other. It is a further object to provide for such splicing without overlap.

Other objects are to provide accurate alignment of the margins to be joined, to provide progressive joining of the sheet material, to provide for adjustment of splices at different angles, and to provide for releasing the work from the splicing mechanism.

These and other objects will appear from the following description and the accompanying drawings.

Of the drawings,

Fig. 1 is a plan view of apparatus constructed in accordance with and embodying the invention, parts being broken away.

Fig. 2 is a cross sectional view thereof, taken on line 2—2 of Fig. 1, parts being broken away.

Fig. 3 is a detail plan view showing the locating pins, parts being broken away.

Fig. 4 is a cross sectional view, taken on line 4—4 of Fig. 2, parts being broken away.

Fig. 5 is an elevation taken on line 5—5 of Fig. 2, parts being broken away.

Fig. 6 is a diagram of the piping and valves.

Fig. 7 is a detail view of the splice pressing tool, the work support and the material to be spliced being shown in section, the tool being shown as raised above the work.

Fig. 8 is a similar view showing the tool in its lowered position.

Fig. 9 is a sectional plan view, taken on line 9—9 of Fig. 7.

Fig. 10 is a view similar to Fig. 9 showing a modification.

Fig. 11 is a view similar to Fig. 8 showing a tool with the prongs in overlapped or meshed position, parts being broken away.

Fig. 12 is a view similar to Fig. 7 showing a further modification.

Referring to the drawings, the numeral 10 designates a table-like support having at one end thereof notched bearings 11—12 for rotatably supporting a bar 13 which in turn supports a wind-up roll 14. Intermediate the ends of the table-like support 10 are a series of belt supporting pulleys 15 each of which extends through an opening 16 in the support. Conveyor belts 17 each have a reach extending lengthwise of and above the support and a return reach thereunder. The belts are driven by a roll (not shown) and collectively support blocks 18 of bias-cut rubberized cord fabric which they advance from left to right as seen in Fig. 1, the cords of the blocks being all arranged at an acute angle to the direction of travel of the belts and the blocks being in spaced apart relation. The pulleys 15 may be arranged with their axes spaced apart at equal intervals in the direction of travel of the belts and similar points of intersection of their peripheries with the upper surface of the support in alignment across the support along lines parallel to the leading and trailing margins of the blocks so that as a block is advanced beyond the pulleys its marginal alignment with the support is parallel to its disposition upon the belts.

Adjustably secured to the support beyond the pulleys 15 in the direction of travel of the blocks 18 is a cross beam 25 below the support and a pair of laterally spaced apart pedestal housings 26, 27 above the support. Aligned bearings 28, 29 are slideably mounted for vertical movement in the housings 26, 27 respectively and rotatably support a multiple throw crank shaft 30 having its axis disposed parallel to the support 10 and at an acute angle thereacross and parallel to the advancing margins of the blocks 18. Connecting the housings 26, 27 above the support and below the crank shaft is a beam 31 having spaced-apart vertical guideways for a series of plungers 32. Each plunger is pivotally connected to a connecting rod 33 which engages a throw 34 of the crank shaft. The throws of the crank shaft are arranged in succession across the support 10 in rotative advance of each other by equal angles. Each plunger has a splicing tool 35 secured thereto. The arrangement is such that as the crank shaft is rotated the tools engage the fabric in succession along the splice.

For rotating the crank shaft 30, a motor 40 is mounted on the housing 26 and drives a sprocket 41 through a speed reducer 42. A jack-shaft 43 is rotatably mounted on housing 26 and has sprockets 44, 45 fixed thereto. A chain 46 engages sprockets 41 and 44 to drive the jack shaft which is parallel to the crank shaft and at substantially the same elevation. A sprocket 47 is fixed to the crank shaft 30 and a chain 48 engages sprockets 45 and 47 to drive the crank shaft. The arrangement provides for permitting vertical movement of the crank shaft without disturbing its driven relation to the motor.

The crank shaft is normally held in a lowered position when the splicing tools engage the work resiliently upon rotation of the crank-shaft and, for this purpose compression coil springs 50, 51 are mounted between the bearings 28, 29 respectively and portions of the housings 26, 27 thereabove so as normally to force the crank shaft downwardly. Below the bearings 28, 29 respectively are fluid pressure operated cylinders 52, 53 mounted upon the housings 26, 27 with their plungers 54, 55 engaging the lower sides of the bearings. The arrangement is such that when fluid under pressure is admitted to the cylinders 52, 53, the bearings and crank-shaft are raised against the pressure of the springs 50, 51 so that the tools 35 clear the work.

The tools 35, as seen in detail in Figs. 7 to 12 each comprises a head 60 to which a pair of opposed material-engaging elements or fingers 61, 62 are pivotally connected, as at 63, 64. The material-engaging tips of the fingers are positioned close to each other relative to the spacing of their pivots 63, 64, or within the vertically projected area bounded on opposite sides by the axis of the pivots so that as the head 60 is lowered and the tips of the fingers engage the fabric they are forced toward each other against the tension of a coil spring 67 connecting ends of the fingers above their pivots and urging them apart. The arrangement is such that in their lowering movement, with two blocks of cord material substantially abutting along a line intersected by the axis of the plunger 32, each finger engages a margin of one of the cord blocks at a position near the line of abutment and by frictional engagement with the fabric urges the blocks toward each other at the position of contact and into pressure engagement with each other, thereby butt splicing the blocks to each other. Where the blocks have been cut from a continuous rubber-coated band of cords, any rubber-like material beyond the outermost cord, such as results from calendering need not be trimmed off as it assists in providing rubber-like material at the splice.

In the form of tool shown in Figs. 7 and 8, the finger tips 65, 66 of the fingers are curved so that they extend substantially in a horizontal plane in their raised or separated position illustrated in Fig. 7 and are inclined upwardly toward each other at their lowest position illustrated in Fig. 8, as the fingers so formed present more blunt surfaces to the fabric and are less liable to rupture the fabric adjacent the splice by penetration or crushing, while in approaching their lowermost position they substantially touch each other and confine the material at the splice between a reentrant pocket formed by the faces of the finger tips and the support 10 exerting strong confining pressure on the material at the splice.

In the embodiment of Fig. 12, the finger tips of the material engaging elements normally approach each other in V formation and provide greater pushing action against the margins of the blocks with less slippage and are more suitable where the rubber-like material covering the cords is tougher and thicker, requiring higher pressure.

The material-engaging elements or fingers 61, 62 are of such width as collectively to cover the extent of the splice, as seen in Fig. 2, and the tips of the fingers may be relieved at intervals by notches 70 separating prongs thereof so as to concentrate the unit pressure on the work at spaced intervals along the splice, the prongs of opposite fingers being preferably arranged opposite each other as shown in Fig. 9.

With such opposite arrangement of the prongs, pressure of the margins of the material is concentrated in the region of the prongs at intervals across the material while at the same time the prongs are so closely spaced that sufficient pressure is transmitted through the material, due to its stiffness, to press the margins at the notches into abutting relation with each other. On the other hand, as with very adhesive material the unit pressure may be reduced, if desired, by staggering the notches in opposite fingers so that the prongs on one finger are opposite the notches in the other finger as shown in Fig. 10.

With this arrangement of the prongs, the prongs of one material-engaging element span the notches of the opposite element and concentration of pressure is reduced while, due to stiffness of the material pressure is transmitted through the margins of the material between the notches, resulting in pressure splicing of the material at all positions along the splice. Also with this arrangement of the prongs, the prongs of opposite fingers may move past each other, as shown in Fig. 11, thereby smoothing the splice.

For aligning the margins of a block of fabric with the trailing margin of the spliced material, a bar 72 is slideably mounted for vertical movement below the support between guides 73, 74. A row of upwardly projecting pins 75 are mounted on the bar and extend into clearance apertures through the support 10 arranged along the splicing line. A pair of fluid pressure operated cylinders 76, 77 are mounted on the guides 73, 74 with their plungers engaging under the bar 72. The arrangement is such that when fluid under pressure is admitted to cylinders 76, 77, the bar 72 is raised and the pins 75 are projected above the support 10 so that they provide a guide against which the operator may adjust the trailing margin of the spliced material and the leading margin of the oncoming block, and when the pressure in cylinders 76, 77 is released, the pins are retracted below the upper face of the support 10.

To provide for splicing at various angles to the direction of travel of the belts 17, arcuate slots 80, 81 are formed through the support 10 and clamp bolts 82, 83 extend through the housings 26, 27 and the beam 25 and through the slots 80, 81. Also the apertures through the support 10, as seen in Fig. 3, are formed arcuately from the center of the support 10 outwardly thereof, all of the arcuate slots having as their center of curvature a point central of the pin 75a located midway of the path of travel of the fabric material. The arrangement is such that by loosening the bolts 82, 83 the beam 25 and the housings 26, 27 together with the splicing tools and locating pins may be angularly adjusted about the center of the pin 75a and clamped in their new position by the bolts 82, 83.

For convenience of operation, the cylinders 52, 53, 76, 77 may be supplied with pressure fluid from a single line 90 and controlled by a single valve 91 controlling, when depressed, flow from a pressure source (not shown) through a line 92, and when released exhaust of line 91 through a port 93. Cylinders 76, 77 are directly connected to line 90 for quick exhaust to lower the pins 75 in advance of lowering of the splicing tools 35. Cylinders 52, 53 are connected to line 90 through slow leak pressure operated butterfly valves 94, 95 to delay lowering the splicing tools.

The arrangement is such that when valve 91 is depressed the plungers of cylinders 52, 53, 76, 77 being raised simultaneously as the valves 94, 95 are fully opened by the pressure from line 90, and when valve 91 is released, the cylinders 52, 53 lower the pins 75 promptly while the valves 94, 95 close except for the slow leaks therethrough and the fluid from cylinders 52, 53 is slowly released therefrom permitting the springs 50, 51 to lower the splicing tools after the pins 75 have been retracted.

In the operation of the apparatus the blocks 18 of material are delivered preferably step by step along the support 10 with their leading margins diagonal to the support. As a block which has just been spliced to preceding ones passes the splicing apparatus, the operator adjusts its trailing margin to contact the locating pins 75 and adjusts the next block with its leading margin against the pins, while depressing the valve 91 to hold the splicing tools and the pins 75 in raised position. After adjusting the fabric blocks, the operator releases the valve 91, thereby lowering the pins 75 and then the splicing tools. As the splicing tools 35 are lowered, the operator starts the motor 40 causing the crankshaft to rotate and advance the splicing tools in succession. The tools prod the margins of the material toward each other into abutting relation progressively along the joint. Preferably the crankshaft is rotated for a sufficient time to cause each pair of fingers to contact the material several times. The motor 40 may then be stopped and the spliced material advanced the length of a block by rotating the roll 14 to wind it thereupon. The operator then depresses the valve 91 to raise the pins 75 and proceeds to adjust the material for the next splice.

Variations may be made without departing from the scope of the invention as it is defined by the following claims.

I claim:

1. Apparatus for splicing opposed margins of sheet material, said apparatus comprising a pair of material-engaging elements each having an edge portion for engaging said material adjacent a margin thereof, and means mounting said elements for swinging movement of said edge portions toward each other upon pressure of the elements against said material.

2. Apparatus for splicing opposed margins of sheet material, said apparatus comprising a pair of material-engaging elements each having an edge portion for engaging said material adjacent a margin thereof, and means mounting said elements for movement of said edge portions toward each other upon pressure of the elements against said material, said mounting means including pivotal connections for said elements.

3. Apparatus for splicing opposed margins of sheet material, said apparatus comprising a pair of material-engaging elements each having an edge portion for engaging said material adjacent a margin thereof, pivot means mounting said elements for movement of said edge portions toward each other upon pressure of the elements against said material, and spring means urging said elements apart.

4. Apparatus for splicing opposed margins of sheet material, said apparatus comprising a pair of material-engaging elements each having an edge portion for engaging said material adjacent a margin thereof, said elements having convexly rounded tips for engaging the material, and pivot means mounting said elements for movement of said edge portions toward each other upon pressure of the elements against said material.

5. Apparatus for splicing opposed margins of sheet material, said apparatus comprising a pair of material-engaging elements each having an edge portion for engaging said material adjacent a margin thereof, each of said elements having on said edge portions work-contacting prongs separated by notches therebetween, and means mounting said elements for movement of said edge portions toward each other upon pressure of the elements against said material.

6. Apparatus for splicing opposed margins of sheet material, said apparatus comprising a pair of material-engaging elements each having an edge portion for engaging said material adjacent a margin thereof, each of said elements having on said edge portions work-contacting prongs separated by notches therebetween, and opposed elements having the prongs of one element opposite to notches of the other, and means mounting said elements for movement of said edge portions toward each other upon pressure of the elements against said material.

7. Apparatus for butt-splicing adhesive sheet material, said apparatus comprising means for supporting two sheets of material with their margins in close proximity to each other along a desired line of splice, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice.

8. Apparatus for butt-splicing adhesive sheet material, said apparatus comprising means for supporting two sheets of material with their margins in close proximity to each other along a desired line of splice, means for locating the margins of the sheets in the desired alignment, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice.

9. Apparatus for butt-splicing adhesive sheet material, said apparatus comprising means for supporting two sheets of material with their margins in close proximity to each other along a desired line of splice, means for locating the margins of the sheets in the desired alignment, said locating means comprising locating pins extending through said support, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice.

10. Apparatus for butt-splicing adhesive sheet material, said apparatus comprising means for supporting two sheets of material with their margins in close proximity to each other along a desired line of splice, means for locating the margins of the sheets in the desired alignment, said locating means comprising locating pins extending through said support, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice, and means for raising said pressing means out of range of contact with said material to release the spliced material.

11. Apparatus for butt-splicing adhesive sheet material, said apparatus comprising means for supporting two sheets of material with their margins in close proximity to each other along a desired line of splice, means for locating the margins of the sheets in the desired alignment, said locating means comprising locating pins extending through said support, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice, means for raising said pressing means out of range of contact with said material to release the spliced material, and means for retracting said locating pins to permit advance of spliced material.

12. Apparatus for butt-splicing adhesive sheet material, said apparatus comprising means for supporting two sheets of material with their margins in close proximity to each other along a desired line of splice, means for locating the margins of the sheets in the desired alignment, said locating means comprising locating pins extending through said support, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice, means for raising said locating pins above said support and simultaneously raising said pressing means out of range of contact with said material to permit adjustment of the material, and means for retracting said pins and advancing said pressing means into contacting relation to the material.

13. Apparatus for butt-splicing adhesive sheet material, said apparatus comprising means for supporting two sheets of material with their margins in close proximity to each other along a desired line of splice, reciprocating pressing means mounted for movement toward and from said support for intermittent contact with said material, said pressing means comprising a reciprocating member, opposed fingers pivotally mounted on said head, said fingers having tips for engaging opposite margins of the sheets of material at positions within a vertically projected area bonded on opposite sides by the pivotal axes of said fingers, and means for resiliently holding said fingers in laterally spaced apart relation.

14. Apparatus for butt-splicing adhesive sheet material, said apparatus comprising means for supporting two sheets of material with their margins in close proximity to each other along a desired line of splice and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice, and means for adjusting said pressing means with relation to said support to change the angularity of the line of splice.

15. Apparatus for butt-splicing adhesive sheet material, said apparatus comprising means for supporting two sheets of material with their margins in close proximity to each other along a desired line of splice, means for locating the margins of the sheets in the desired alignment, said locating means comprising locating pins extending through said support, and reciprocating pressing means mounted for movement toward and from said support for intermittent contact with said material, said pressing means comprising members mounted for resultant movement toward each other along the surface of said support upon pressure contact of the members against the sheets at positions opposite each other across the line of splice, and means for adjusting said locating pins and said pressing means simultaneously with relation to said support to change the angularity of the line of splice.

16. Apparatus for butt-splicing adhesive sheet material, said apparatus comprising means for supporting two sheets of material with their margins in close proximity to each other along a desired line of splice and reciprocating pressing means mounted for movement toward and from said support for intermittent contact with said material, said pressing means comprising a series of pressing members mounted in spaced apart relation across said support along the line of splice, each pressing member having fingers pivotally mounted thereon for resultant movement toward each other along the surface of said support upon pressure contact of the fingers against the sheets at positions opposite each other across the line of splice.

17. Apparatus for butt-splicing adhesive sheet material, said apparatus comprising means for supporting two sheets of material with their margins in close proximity to each other along a desired line of splice and reciprocating pressing means mounted for movement toward and from said support for intermittent contact with said material, said pressing means comprising a series of pressing members mounted in spaced apart relation across said support along the line of splice, each pressing member having fingers pivotally mounted thereon for resultant movement toward each other along the surface of said support upon pressure contact of the fingers against the sheets at positions opposite each other across the line of splice and means for presenting said members to the sheet material in succession along the line of splice.

CHARLES W. LEGUILLON.

REFERENCES CITED

The following references are of record in the file of this patent:

UNITED STATES PATENTS

| Number | Name | Date |
|---|---|---|
| 1,041,201 | Turner | Oct. 15, 1912 |